(12) United States Patent
Bondarenko et al.

(10) Patent No.: US 12,335,221 B2
(45) Date of Patent: Jun. 17, 2025

(54) GENERATING CURATED MATCHES AMONG INDIVIDUALS

(71) Applicant: Bumble IP Holdco LLC, Wilmington, DE (US)

(72) Inventors: Anton Bondarenko, London (GB); Zakaria Jallaly, London (GB)

(73) Assignee: Bumble IP Holdco LLC, Wilmington, DE (US)

( * ) Notice: Subject to any disclaimer, the term of this patent is extended or adjusted under 35 U.S.C. 154(b) by 0 days.

(21) Appl. No.: 17/525,454

(22) Filed: Nov. 12, 2021

(65) Prior Publication Data

US 2022/0158965 A1 May 19, 2022

Related U.S. Application Data

(60) Provisional application No. 63/113,794, filed on Nov. 13, 2020.

(51) Int. Cl.

| | |
|---|---|
| *G06F 15/16* | (2006.01) |
| *G06F 3/0482* | (2013.01) |
| *G06Q 50/00* | (2012.01) |
| *H04L 51/046* | (2022.01) |

(Continued)

(52) U.S. Cl.
CPC ............ *H04L 51/52* (2022.05); *G06F 3/0482* (2013.01); *G06Q 50/01* (2013.01); *H04L 51/046* (2013.01); *H04L 67/306* (2013.01)

(58) Field of Classification Search
CPC ..... H04L 51/52; H04L 51/046; H04L 67/306; G06F 3/0482; G06Q 50/01
See application file for complete search history.

(56) References Cited

U.S. PATENT DOCUMENTS

| | | | | |
|---|---|---|---|---|
| 6,363,900 B1 * | 4/2002 | Homi | ............... | F02M 35/10347 123/184.21 |
| 6,963,900 B2 * | 11/2005 | Boyd | .................. | G06Q 10/109 709/219 |

(Continued)

FOREIGN PATENT DOCUMENTS

| | | | | | |
|---|---|---|---|---|---|
| GB | | 2506575 A | * | 4/2014 | ....... G06F 17/30867 |
| WO | WO 2020/089813 | | | 5/2020 | |

OTHER PUBLICATIONS

International Search Report and Written Opinion in International Appln. No. PCT/IB2021/060524, dated Feb. 9, 2022, 13 pages.

(Continued)

*Primary Examiner* — Moustafa M Meky
*Assistant Examiner* — Thorne E Waugh
(74) *Attorney, Agent, or Firm* — Fish & Richardson P.C.

(57) ABSTRACT

Techniques for generating curated matches among individuals include supplying, to a client device, data for display in a graphical user interface, the data including a set of prompts to an individual to specify criteria for identification of one or more other individuals. The criteria is received from the client device and used to identify potential matches between the individual and one or more other individuals from a pool of individuals. A subset of up to a predetermined number of potential matches is selected from the identified potential matches. Profile information for each potential match in the subset of potential matches is supplied to the client device at a scheduled time.

20 Claims, 7 Drawing Sheets

(51) Int. Cl.
*H04L 51/52* (2022.01)
*H04L 67/306* (2022.01)

(56) References Cited

U.S. PATENT DOCUMENTS

| | | | | |
|---|---|---|---|---|
| 7,284,033 | B2 * | 10/2007 | Jhanji | G06Q 30/02 |
| | | | | 709/204 |
| 7,603,413 | B1 * | 10/2009 | Herold | H04L 12/1813 |
| | | | | 709/204 |
| 8,060,463 | B1 * | 11/2011 | Spiegel | G06F 16/24 |
| | | | | 709/224 |
| 8,145,584 | B2 * | 3/2012 | Juan | G06Q 50/01 |
| | | | | 706/45 |
| 8,688,141 | B2 * | 4/2014 | Ribaudo | H04W 64/00 |
| | | | | 455/456.2 |
| 8,700,644 | B1 * | 4/2014 | Allen | H04L 67/535 |
| | | | | 706/45 |
| 9,094,390 | B1 * | 7/2015 | Rao | H04L 51/52 |
| 9,412,097 | B2 * | 8/2016 | Jaffee | G06Q 10/1095 |
| 9,836,533 | B1 * | 12/2017 | Levi | G06Q 30/02 |
| 10,261,970 | B2 * | 4/2019 | Zuckerberg | G06Q 50/10 |
| 10,565,276 | B2 * | 2/2020 | Finder | G06F 16/9535 |
| 10,796,386 | B1 * | 10/2020 | Miller | G06F 16/29 |
| 11,386,172 | B1 * | 7/2022 | Cheremkhin | G06F 16/9535 |
| 12,184,747 | B2 * | 12/2024 | Berookhim | H04L 69/02 |
| 2008/0120375 | A1 * | 5/2008 | Levy | H04W 4/02 |
| | | | | 709/204 |
| 2014/0330809 | A1 * | 11/2014 | Raina | G06F 16/86 |
| | | | | 707/755 |
| 2020/0082350 | A1 * | 3/2020 | Aagaard | G06Q 10/1095 |
| 2020/0134288 | A1 * | 4/2020 | Frolovichev | G06V 40/1365 |
| 2020/0137003 | A1 * | 4/2020 | Frolovichev | H04L 51/04 |
| 2021/0234748 | A1 * | 7/2021 | Frind | G06Q 30/08 |
| 2021/0287304 | A1 * | 9/2021 | Belton | G06Q 10/02 |
| 2021/0329428 | A1 * | 10/2021 | Aaltonen | H04W 68/005 |
| 2022/0103438 | A1 * | 3/2022 | Kerzner | G06F 16/9535 |

OTHER PUBLICATIONS

International Preliminary Report on Patentability in International Appln. No. PCT/IB2021/060524, mailed May 25, 2023, 8 pages.

* cited by examiner

GENERATING CURATED MATCHES AMONG INDIVIDUALS

PRIORITY

This application claims priority to and the benefit of U.S. Provisional Patent Application No. 63/113,794, filed Nov. 13, 2020, the entire contents of which is incorporated herein by reference.

TECHNICAL FIELD

This disclosure relates generally to social media applications deployed in computer networks.

BACKGROUND

Social media applications can propose matches between individuals, such as potential friends, dating partners, or business partners, among others. Once a proposed match is accepted, matched individuals may communicate with one another electronically using the dating application.

SUMMARY

In general, in a first aspect, a computer-implemented method for generating curated matches among individuals includes supplying, to a client device, data for display in a graphical user interface, the data including a set of prompts to an individual to specify criteria for identification of one or more other individuals; receiving the criteria from the client device; identifying potential matches between the individual and one or more individuals from a pool of individuals based on the criteria; selecting a subset of potential matches from the potential matches, the subset of potential matches having up to a predetermined number of potential matches; and supplying to the client device profile information for the subset of potential matches at a scheduled time.

In general, in a second aspect, a system includes at least one processor and memory storing instructions executable by the at least one processor to cause the at least one processor to perform operations including supplying, to a client device, data for display in a graphical user interface, the data including a set of prompts to an individual to specify criteria for identification of one or more other individuals; receiving the criteria from the client device; identifying potential matches between the individual and one or more individuals from a pool of individuals based on the criteria; selecting a subset of potential matches from the potential matches, the subset of potential matches having up to a predetermined number of potential matches; and supplying to the client device profile information for the subset of potential matches at a scheduled time.

In general, in a third aspect, at least one non-transitory computer-readable storage medium stores instructions executable by at least one processor to cause the at least one processor to perform operations including supplying, to a client device, data for display in a graphical user interface, the data including a set of prompts to an individual to specify criteria for identification of one or more other individuals; receiving the criteria from the client device; identifying potential matches between the individual and one or more individuals from a pool of individuals based on the criteria; selecting a subset of potential matches from the potential matches, the subset of potential matches having up to a predetermined number of potential matches; and supplying to the client device profile information for the subset of potential matches at a scheduled time.

In a fourth aspect, combinable with any of the first through third aspects, the prompts include a plurality of targeted questions for identification of the one or more other individuals, and the criteria includes answers selected from a predefined set of answers for each of the targeted questions.

In a fifth aspect, combinable with any of the first through fourth aspects, identifying the potential matches between the individual and the one or more other individuals includes identifying multiple distinct groups of individuals from the pool of individuals, and applying the criteria to each of the distinct groups of individuals to identify the potential matches.

In a sixth aspect, combinable with the fifth aspect, identifying the distinct groups of individuals includes applying at least one criteria related to use of a social media application to the pool of individuals.

In a seventh aspect, combinable with the fifth or sixth aspects, identifying the distinct groups of individuals includes applying two or more different matching models to the pool of individuals.

In an eighth aspect, combinable with any of the fifth through seventh aspects, selecting the subset of potential matches from the potential matches includes selecting at least one potential match from each of the distinct groups.

In a ninth aspect, combinable with the eighth aspect, each of the potential matches are associated with a rank or score, and the potential match selected from each of the distinct groups includes the potential match having the highest rank or score within the group.

In a tenth aspect, combinable with any of the first through ninth aspects, identifying the potential matches between the individual and the one or more other individuals includes applying at least one filter to the pool of individuals based on the criteria.

In an eleventh aspect, combinable with any of the first through tenth aspects, operations of the process further include collecting a match acceptance from the client device for a second individual identified in the subset of potential matches, and in response to the match acceptance, enabling network communication between the individual and the second individual.

Implementations of the above aspects can include one or more of the following advantages.

By providing users with a curated shortlist of the best potential matches based on their interests, the technology described here helps users find more meaningful connections and improves their social media dating application experience. For example, some users of social media dating applications receive a high volume of match requests and find it difficult to select profiles to initiate chats with. On the other hand, some users make a lot of match requests, but experience diminished returns in matches or chats. Through the curated matches technology, the amount of time, energy, and computing resources these users spend sending or sifting through requests can be significantly reduced by consolidating their efforts on the application to a few select individuals. This consolidation also fosters more meaningful connections, thereby improving matchmaking technology itself.

In some implementations, the curated matches are provided to users at a certain day and time each week. As such, the technology encourages users to convene on the application during a particular time period, thereby promoting more efficient (and meaningful) real-time communications as opposed to inefficient asynchronous communications, which further reduces consumption of computing and other resources. In addition, by generating the curated matches from multiple distinct lists of user profiles derived from different criteria in some implementations, the diversity of potential matches is increased, thereby improving the likelihood and quality of matches and matchmaking technology in general.

DETAILED DESCRIPTION

The technology described here periodically generates a curated list of profiles for a user that represent the best potential matches for the user from among a pool of available profiles. To generate the curated list, a series of targeted questions can be presented to the user to obtain information for identifying potential curated matches while minimizing the burden on the user. Advanced filters that operate on information obtained from the targeted questions can then be employed to identify a small number of individuals for inclusion in the curated list. Profiles for the identified individuals are provided to the user at a scheduled time for the user to connect with.

Figure 1:
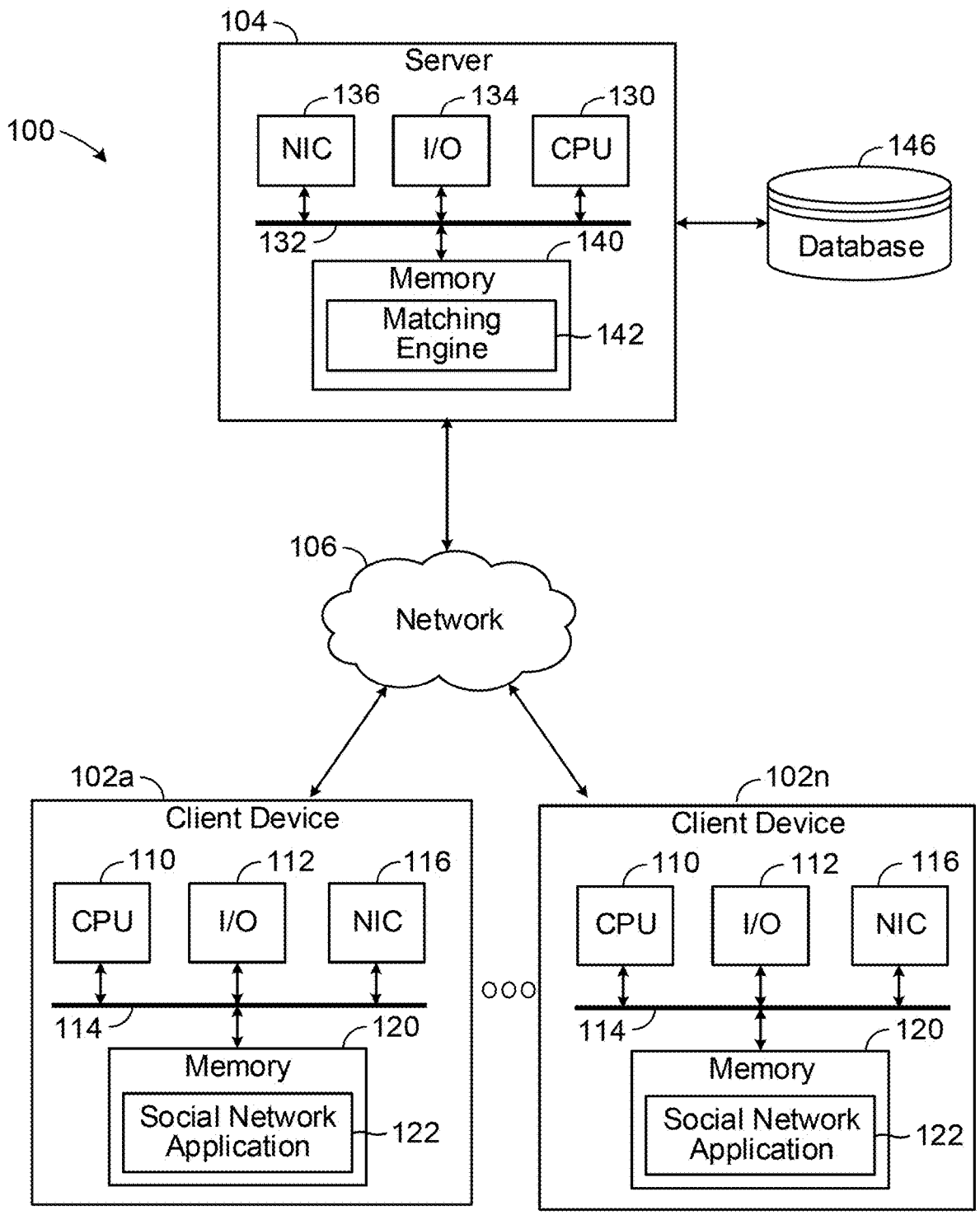
FIG. 1 illustrates a system.

FIG. 1 illustrates a system 100 for generating curated matches among individuals. The system 100 includes a plurality of client devices 102a through 102n in communication with a server 104 via a network 106, which may be a wired network, a wireless network, or any combination thereof. Each client device 102a through 102n (referred to collectively as client devices 102) includes a processor (e.g., central processing unit) 110 in communication with input/output devices 112 via a bus 114. The input/output devices 112 can include a touch display, keyboard, mouse, and the like. A network interface circuit 116 is also connected to the bus 114 to provide wired and/or wireless connectivity to the network 106. A memory or other storage medium 120 is also connected to the bus 114. The memory 120 stores instructions executed by the processor 110. In particular, the memory 120 stores instructions for a social network application 122, such as a dating application, which communicates with server 104 to coordinate introductions between users that have been identified as potential matches (e.g., potentials friends, dating partners, business partners, etc.). In some implementations, each client device 102 is a mobile device (e.g., smartphone, laptop, tablet, wearable device, etc.) executing the social network application 122. Different client devices 102 are operated by different users that subscribe to the same social network application 122.

The server 104 includes a processor 130, a bus 132, input/output devices 134 and a network interface circuit 136 to provide connectivity to the network 106. A memory 140 is connected to the bus 132. The memory 140 stores a matching engine 142 with instructions executed by the processor 130 to implement operations disclosed in connection with FIGS. 2 through 7. In some implementations, the system 100 includes a database 146 in communication the server 104 that stores information for use by the social network application 122, the matching engine 142, and/or the selection engine 144, such as user profile information, match information, message information, or other information.

In operation, a user of a client device 102 can create a personal profile to participate in the social network application 122. For example, a user can create a personal profile by interacting with a user interface to provide profile information, such as their name, age, biographical text, photographs, and a range of other fields (e.g., city, links to social media profiles on other networks, etc.) that allow the user to characterize himself or herself. Each user can also specify their interests for use in identifying potential matches. For example, a user can specify their interests by interacting with a user interface to provide various criterion that the user is looking for in a potential match, such as age, distance, hobbies, commitment disposition, or combinations of them, among others. In some implementations, the system 100 (e.g., the matching engine 142) can identify one or more of the criterion instead of or in addition to those specified by the user based on, for example, analysis of the user's interactions with the system 100. The system 100 (e.g., the matching engine 142) can use the interests to generate matching criteria for use in identifying potential matches for the user.

Once a profile is complete, a user can begin to view the profiles of other users, while the user's own profile is circulated among the user base. In some implementations, a user receives profiles of other users who have been identified as potential matches based on their interests. For example, the matching engine 142 can process the profiles of other users to identify those users who satisfy the interests specified by a user. In some implementations, the matching engine 142 can derive matching criteria from the interests, and can use the matching criteria to identify potential matches. The matching engine 142 can then provide the profiles of the potential matches to the user for review. In general, the matching engine 142 can use filters, applied rules, machine learning, or combinations of them, among others, to identify potential matches for a user. For example, the matching engine 142 can generate one or more filters or rules based on the interests of a user, and can apply the filters or rules to profile information for other users to identify potential matches for the user. As another example, the matching engine 142 can include a machine learning model (e.g., a neural network model) trained to identify features from the interests of a user, and the machine learning model can process profile information for other users to identify potential matches for the user.

After identifying one or more potential matches for a user, the matching engine 142 can provide the profiles of the potential matches to the user for review. The user is able to explore the information that has been added to each profile. For example, the application 122 executing on the client device 102 can display a user interface that allows the user to view and explore the information that has been added to a potential match's profile.

To ascertain a mutual agreement to connect two users together, each profile can be voted on by the viewing user. For example, having viewed the personal profile of another user, the viewing user can vote 'yes' if they would like to connect with that specific user, or vote 'no' if they are not interested in connecting. In some implementations, a user can vote 'yes' by interacting with a first user interface button or swiping (e.g., clicking and dragging the profile using their finger) the profile off the screen in a certain direction (e.g., right), and can vote 'no' by interacting with a second user interface button or swiping in another direction (e.g., left). In some implementations, once a user has voted 'yes' for a profile of another user, the matching engine 142 can place the profile of the user into the queue of profiles to be viewed by the other user. Through this mechanism the matching engine 142 is able to accelerate the pace with which two users view each other's profiles than would happen in a purely organic system of profile selection.

When two users both mutually vote 'yes' upon the other user's profile, a connection (sometimes referred to as a "match") is established between the two accounts. Once a match is established, the matching engine 142 can supply a notification of the match to either or both of the matched users with a prompt to contact the other matched user. On the other hand, when one user votes 'yes' but the other user votes 'no,' no further connection is established between the two users, and their profiles are not shown to each other again (or they may be shown again depending on changes within their profile, location, search parameters, or because of time elapsed). In this manner, the matching engine allows the intention of each user within the social network to be communicated.

In some implementations, matched users are directed to a messaging system of the social network to contact the other matched user. Once users are within the messaging system, they can send messages back and forth to one-another. In some implementations, the messaging system displays elements of a user's profile in order to increase recognition of the other user (e.g., name, age, photograph, etc.).

At times, the matching engine 142 generates a curated list of user profiles that represent the best potential matches for a particular user from among a pool of available profiles. For example, the matching engine can prompt a user to provide answers to a small number of targeted questions, such as "What matters in a match?" or "What are they looking for?" The matching engine can then employ advanced filters that operate on the information obtained from the targeted questions and other information (e.g., user interests) to identify a predetermined number of user profiles that represent the best potential matches for the user.

After producing the curated list of user profiles for a particular user, the matching engine 142 provides these profiles (sometimes referred to as "curated profiles") to the user at or after a scheduled time to allow the user to view and select one or more of the profiles for further connection. In some implementations, once a first user has voted 'yes' on a curated profile, the matching engine 142 prompts the second user associated with the selected profile to view the profile of the first user (e.g., by sending a notification to the second user, by placing the profile of the first user into the queue of profiles to be viewed by the second user, etc.). If the second user votes 'yes' to the profile of the first user, a curated match is established between the two users. Once a curated match is established, the matching engine 142 can supply a notification of the curated match to either of both of the matched users with a prompt to contact the other matched user (e.g., using a messaging system in the social network application 122). In some implementations, the messaging system or other portions of the social network application 122 include identifiers for the curated match (e.g., to distinguish curated matches from "normal" matches) or additional information about the curated match (e.g., common interests shared by the individuals of the curated match to facilitate conversation), or both.

Figure 2:
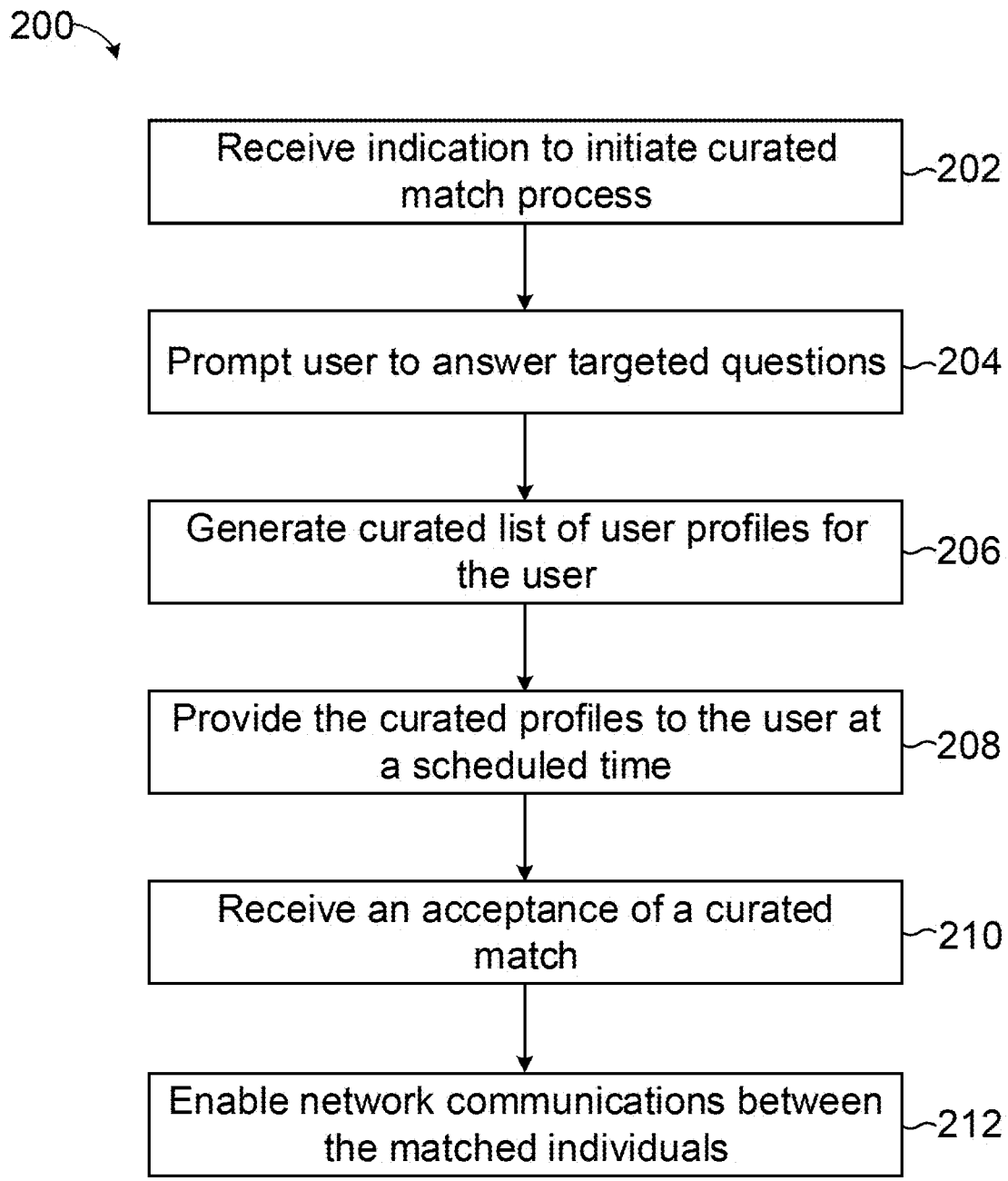
FIG. 2 illustrates processing operations.

Turning to FIG. 2, a process 200 for generating curated matches among individuals is shown. In some implementations, operations of the process 200 are carried out by the social network application 122 executing one or more of the client devices 102, the matching engine 142 executing on the server 104, or both.

Initially, the matching engine 142 receives an indication to initiate the curated match process (202). For example, the matching engine 142 can automatically initiate the curated match process according to a predetermined schedule, such as every Friday at 5:00 pm local time. Alternatively, or in addition, the matching engine 142 can initiate the curated match process in response to a particular event, such as in response to a user registering with the social network application 122, in response to a user subscribing or purchasing a particular feature of the social network application 122, or in response to a user navigating to the curated matches feature within the social network application 122 and interacting with a user interface to begin the curated match process.

Once the curated match process is initiated, the matching engine 142 prompts the user to answer a selected set of targeted questions to obtain information for identifying potential curated matches (204). In general, the matching engine 142 can select the targeted questions from a list of questions stored, for example, in the database 146. The number of targeted questions selected by the matching engine 142 can be small (e.g., four) so as not to burden the user while still obtaining sufficient information for identifying potential curated matches. In some implementations, each targeted question is associated with a set of possible answers from which the user can select. To facilitate identification of potential curated matches, the matching engine 142 can be configured to prompt all users to answer the same set of targeted questions (from the same set of possible answers) during a particular iteration of the curated match process. For example, if curated match process operates on a weekly schedule, then all users who use the curated match feature during that week can be presented the same set of targeted questions. In some implementations, the set of targeted questions can be changed in each iteration (e.g., each week) to increase user engagement and improve the diversity of matches. In some implementations, the set of targeted questions need not be the same for all users and can be selected, for example, at random or based on the interests of a particular user.

Figures 3A, 3B, 3C:
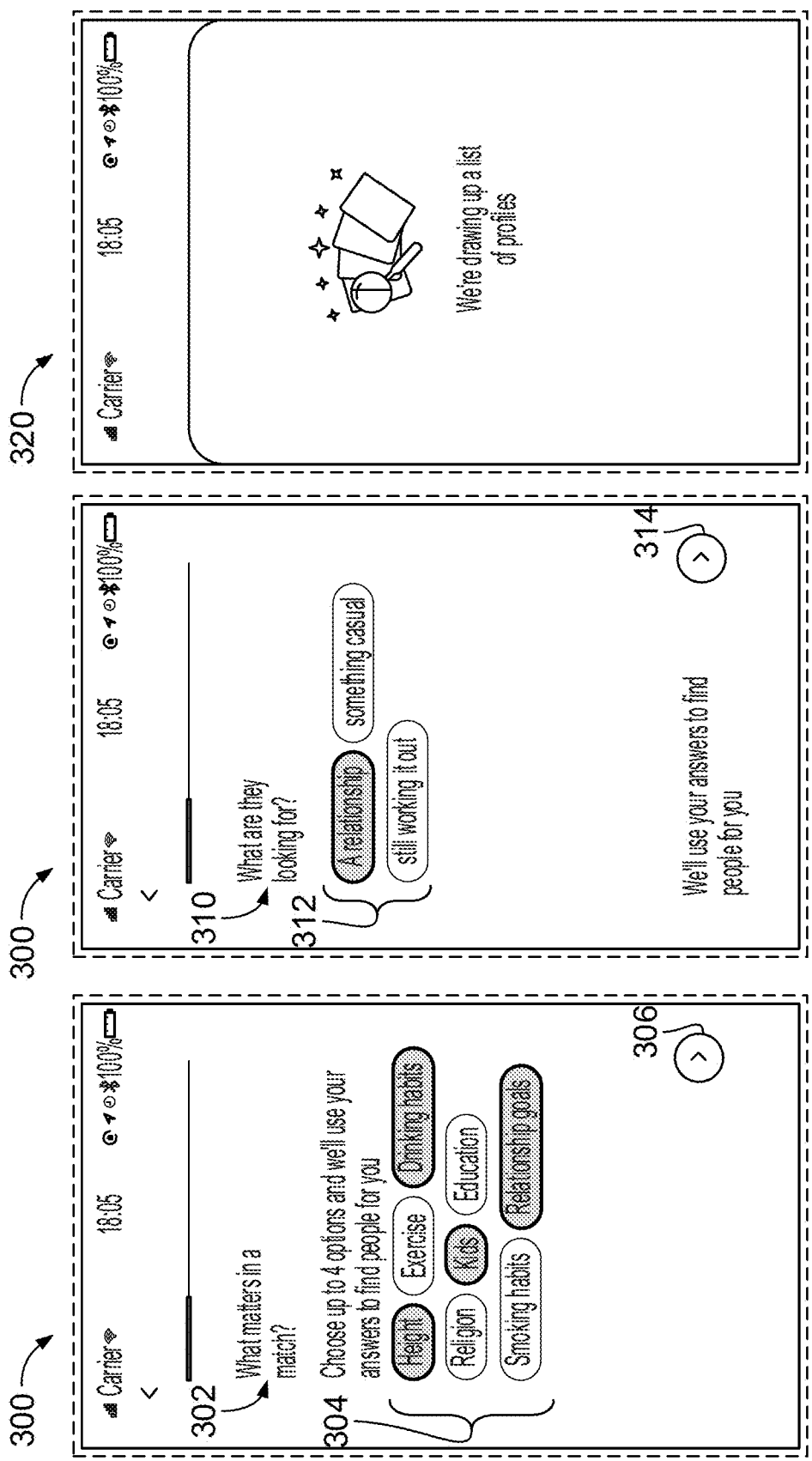
FIGS. 3A through 3C illustrate user interfaces.

After selecting the set of targeted questions, the matching engine 142 prompts the user to answer them. Referring to FIG. 3A, the prompt can cause the social network application 122 executing on the user's device 102 to display a graphical user interface (GUI) 300. The GUI 300 can include a targeted question 302 (e.g., "What matters in a match?") and a list of potential answers 304 to the targeted question (e.g., "height," "exercise," "drinking habits," "religion," "kids," "education," "smoking habits," "relationship goals," etc.). The user can interact with the GUI 300 to select a predetermined number of answers (e.g., four) to the targeted question 302. In some implementations, the user can input their answer by typing into a box displayed in the GUI 300 instead of or in addition to selecting answers from the list of potential answers 304.

Once the user is satisfied with their answers to the targeted question 302, they can select a button 306 to move on to the next question, as shown in FIG. 3B. In this example, the GUI 300 displays a new targeted question 310 (e.g., "What are they looking for?") and a list of potential answers 312 (e.g., "a relationship," "something casual," "still working it out").

The user can interact with the GUI 300 to select an answer to the targeted question 310, and then select a button 314 to move to the next question. Once all targeted questions have been answered, the matching engine 142 can cause the social network application 122 to display a GUI 320 indicating to the user that the curated match process is in progress, as shown in FIG. 3C.

After the receiving answers to the targeted questions from the user, the matching engine 142 uses the answers and other information to generate a curated list of user profiles that represent the best potential matches for the user (206). In general, the matching engine 142 can use any number of matching models, including filters, applied rules, machine learning, or combinations of them, among other techniques, to generate the curated list of user profiles. In some implementations, each user profile in the lists of user profiles can be associated with a score or ranking based on the quality of the potential match (e.g., as determined by the matching model).

In some implementations, the matching engine 142 generates multiple distinct lists of users or user profiles that represent potential matches for the user, and then applies the information obtained from the targeted questions to each of the multiple distinct lists to generate the curated list of user profiles. For example, the matching engine 142 can derive matching criteria from the interests and other information specified by the user during the profile creation stage, and can apply the matching criteria to a pool of users using two or more different matching models (e.g., filters, applied rules, machine learning (neural network) models, or combinations of them, among others) to generate the multiple distinct lists of user profiles that represent potential matches for the user.

Alternatively, or in addition, the matching engine 142 can divide the pool of users into two or more subgroups based on one or more criteria or conditions. For example, the matching engine 142 can divide the pool of users based on one or more criteria related to use of the social network application 122, such as a subgroup of online users, a subgroup of new users (e.g., users who have registered with the social network application 122 within a certain time period, such as within the last month), a subgroup of highly rated users (e.g., users who receive greater than a threshold level of matches or match requests, or are in a top percentile (e.g., top 10%) of matched or requested users), or a subgroup of high participation users (e.g., users who initiate and/or respond to conversations with matched users with greater than a threshold frequency, such as above about a 60% initiation and/or response rate), among others. The matching engine 142 can then apply the derived matching criteria to each subgroup using at least one matching model to generate the multiple distinct lists of users or user profiles that represent potential matches for the user.

In some implementations, after generating the multiple distinct lists of user profiles, the matching engine 142 can apply one or more advanced filters (among other techniques) that operate on the information obtained from the targeted questions to each of the multiple distinct lists in order to generate the curated list of user profiles. In some implementations, the advanced filters can be applied directly to the pool of users or the subgroups of users. For example, if the user indicates that relationship goals are important to them in a match (as shown in FIG. 3A), and that they are looking for a relationship (as shown in FIG. 3B), then the matching engine 142 can generate and apply one or more filters to each list of user profiles to identify users who emphasize relationship goals or are looking for a relationship, or both.

The matching engine 142 can then select the top (e.g., highest scored or ranked) one or more profiles from each filtered list of profiles to generate the curated list of user profiles. By generating the curated list from multiple distinct lists of user profiles, the diversity of potential matches is increased, thereby improving the likelihood and quality of matches and social networking technology in general.

In some implementations, the matching engine 142 uses other information in addition to the information obtained from the targeted questions to generate the curated list. For example, if a user specifies that height is important to them in a match (as shown in FIG. 3A), then the matching engine 142 can use known information about the user's height preferences to infer characteristics of individuals who are potential matches. For instance, a user may specify a relative height preference (e.g., shorter than me) or an absolute height preference (e.g., between 5.5 and 6 feet) in their profile or elsewhere, and the matching engine 142 can incorporate this information into one or more filters when generating the curated list of user profiles.

After generating the curated list, the matching engine 142 provides some or all of the curated profiles to the user at (or after) a scheduled time (208). In some implementations, the matching engine 142 provides a subset of the curated profiles to the user, the subset having up to a predefined number of the curated profiles (e.g., up to four profiles). For example, the matching engine 142 can select up to a predefined number (e.g., one, two, three, four, etc.) of the highest ranked or scored curated profiles to form the subset of curated profiles to be provided to the user. In some implementations, such as where there are multiple distinct lists of curated profiles, the matching engine 142 can select the top (e.g., highest scored or ranked) one or more profiles from each list to form the subset of curated profiles. In some implementations, additional curated profiles can be provided to reward certain users, such as users who interact with the social network application 122 greater than a threshold amount or users who complete a certain amount of their profile, among others. If less than the predefined number of curated profiles are identified, the matching engine 142 can provide fewer curated profiles, or can adjust one or more criteria (e.g., an advanced filter parameter) to increase the number of curated profiles. By limiting the number of curated profiles provided to the user, the matching engine 142 facilitates user engagement by reducing the number of options for the user to consider and accelerates quality matches by providing only the best potential matches to the user.

In some implementations, the curated profiles (or subset of curated profiles) are provided to the user at a scheduled time. For example, the curated profiles can be provided to the user at a certain time each day, week, or month, among other times. If the curated match process is initiated before the scheduled time, the matching engine 142 can withhold (e.g., prevent transmission of) the identified curated profiles until the scheduled time. In some implementations, the matching engine 142 can provide an indication of the scheduled time, which can be presented to the user via a GUI of the social network application 122. By providing curated matches to users on a scheduled basis (which can be recurring), the matching engine 142 encourages users to convene on the application during a particular time period, thereby promoting more efficient (and meaningful) real-time communications as opposed to inefficient asynchronous communications, which reduces consumption of computing and other resources.

Figures 4A, 4B, 4C:
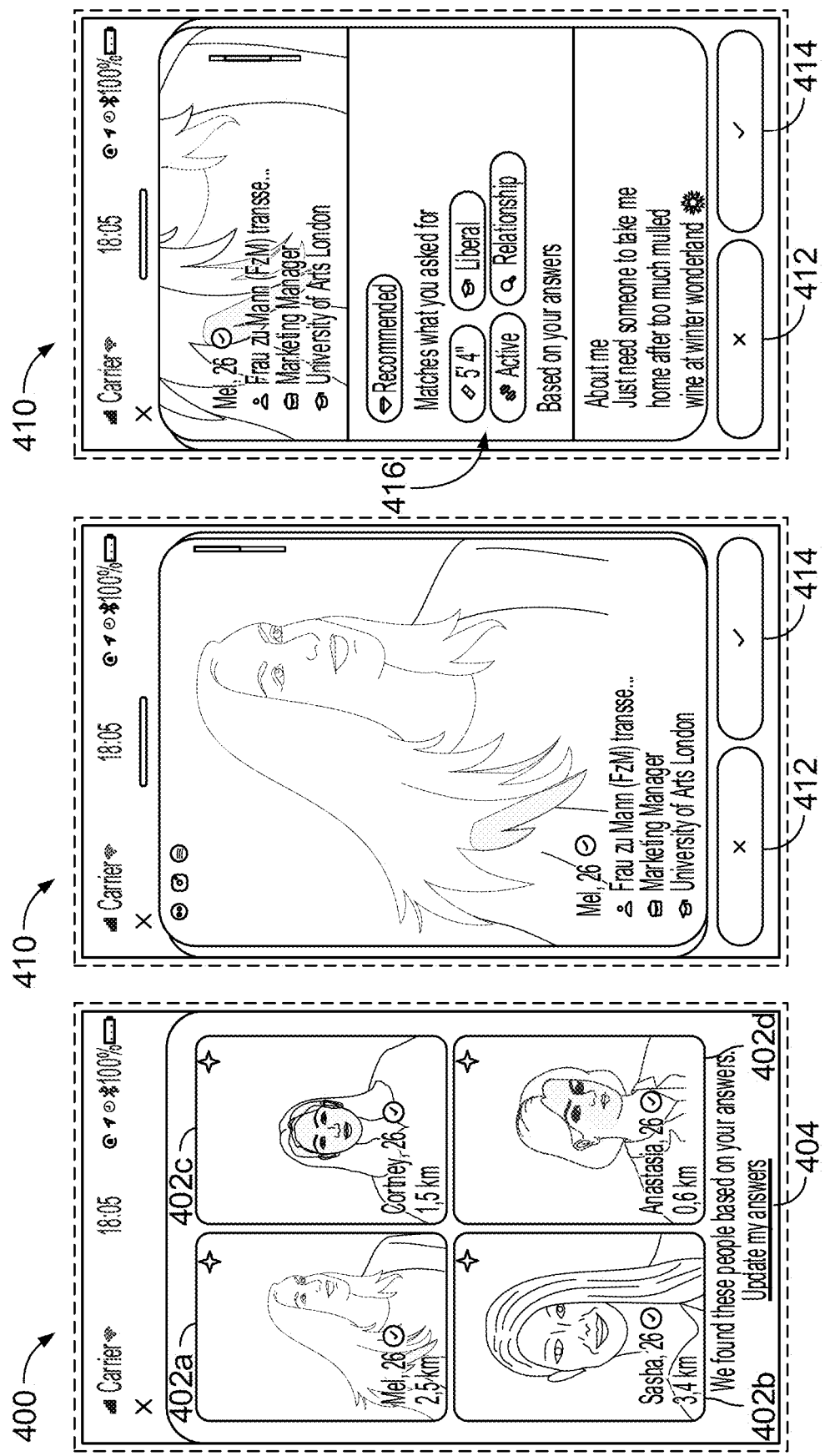
FIGS. 4A through 4E illustrate user interfaces.

To provide the curated profiles to the user, the matching engine 142 can transmit data to the client device 102 to cause the social network application 122 to display a GUI 400, as shown in FIG. 4A. The GUI 400 can include curated profile previews 402a, 402b, 402c, 402d for each of the curated profiles identified for the user. Each preview 402a, 402b, 402c, 402d (collectively referred to as previews 402) can include a portion of the profile information for the respective user, such as the user's name, age, distance, and a picture. In some implementations, each preview 402 can include a list of common interests between the user and the curated profile user identified during the curated match process. In some implementations, the GUI 400 can include an option 404 for the user to update their answers to the targeted questions, which can cause the social network application 122 to redisplay the targeted questions discussed with reference to FIGS. 3A-3C.

Upon selection of one of the previews 402, the social media application 122 can display a GUI 410 shown in FIGS. 4B and 4C. The user can interact with the GUI 410 to explore the information that has been added to the selected profile. The user can also vote whether to match with the profile by using the voting buttons 412, 414 within the GUI 410 (or by performing a swiping gesture on the profile picture). In some implementations, the GUI 410 can include an indication 416 of common interests that the user has with the curated profile user identified during the curated matching process.

Figure 4E:
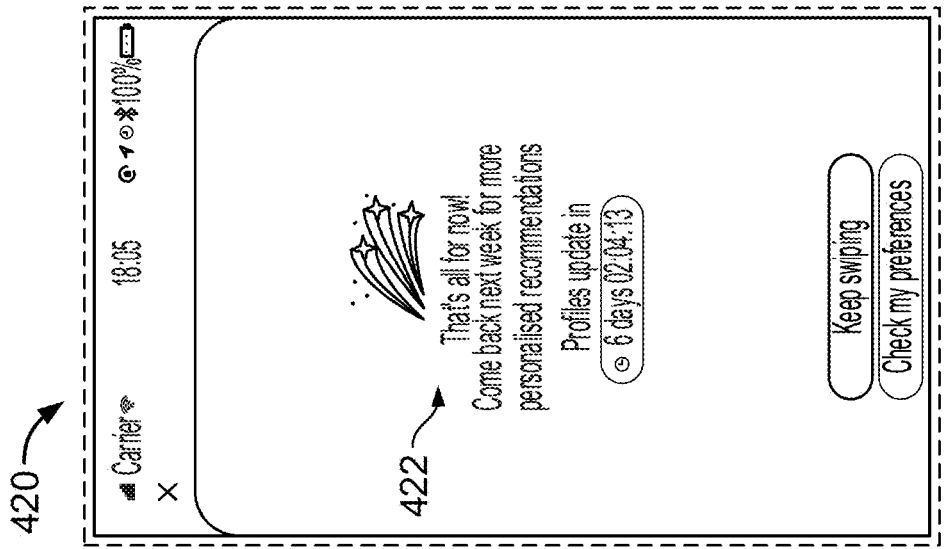
Figure 4D:
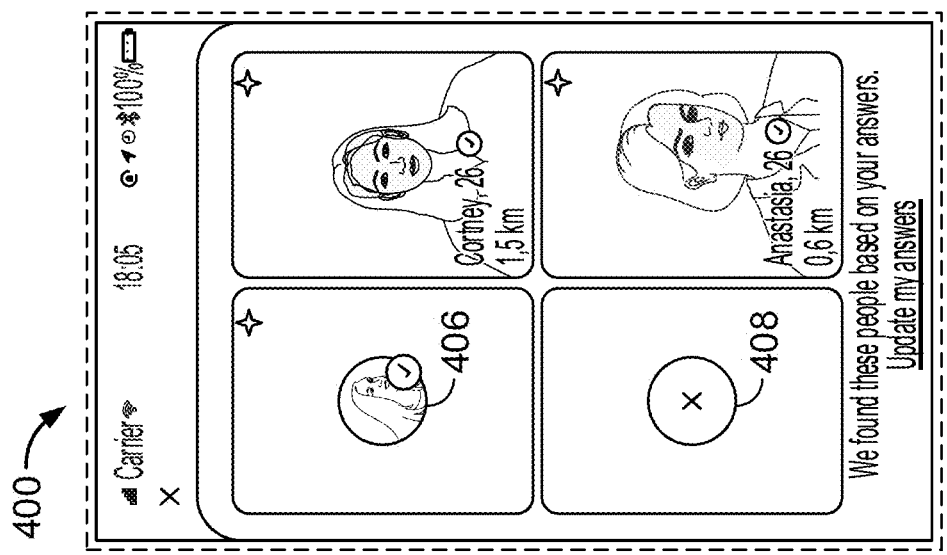

After a user votes for a curated profile, the social media application 122 can redisplay the GUI 400 with the result(s) of the vote, as shown in FIG. 4D. For example, if the user votes 'yes' on the curated profile, then the GUI 400 can include an indication 406 that the user voted 'yes.' On the other hand, if the user votes 'no' on the curated profile, then the GUI 400 can include an indication 408 that the user voted 'no.' Once the user has voted on each of the curated profiles, the social media application 122 can display a GUI 420 with information on next steps and an indication 422 of when the user should expect to receive new curated profiles, as shown in FIG. 4E.

Figure 5:
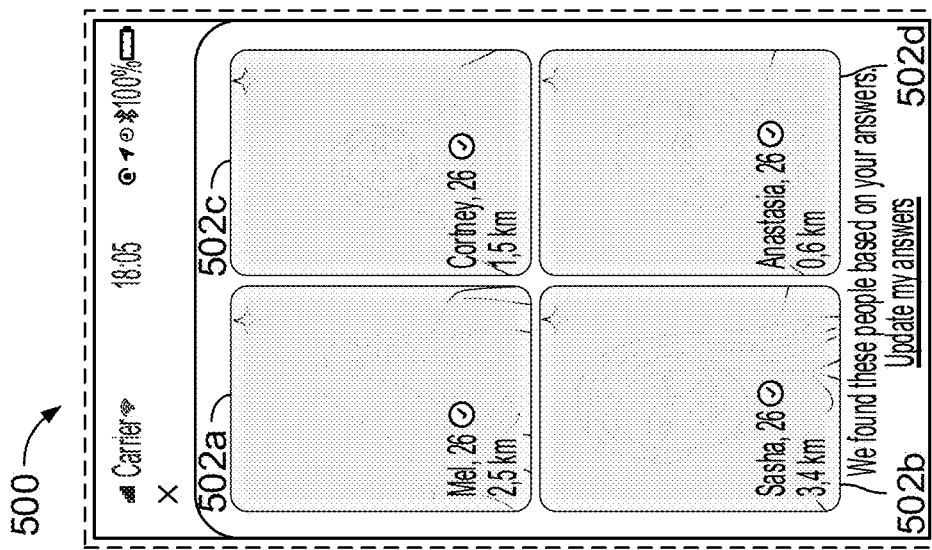
FIG. 5 illustrates a user interface.

In some implementations, the matching engine 142 can cause the social network application 122 to display a GUI 500 in which some or all of the curated profile previews 502a, 502b, 502c, 502d are obscured (e.g., blurred), as shown in FIG. 5. For example, the GUI 500 can be presented to users who do not subscribe to or pay for the social network application 122. In this example, selection of an obscured curated profile preview 502a, 502b, 502c, 502d by the user can redirect the user to a page to subscribe to or pay for the social network application 122.

Figure 6:
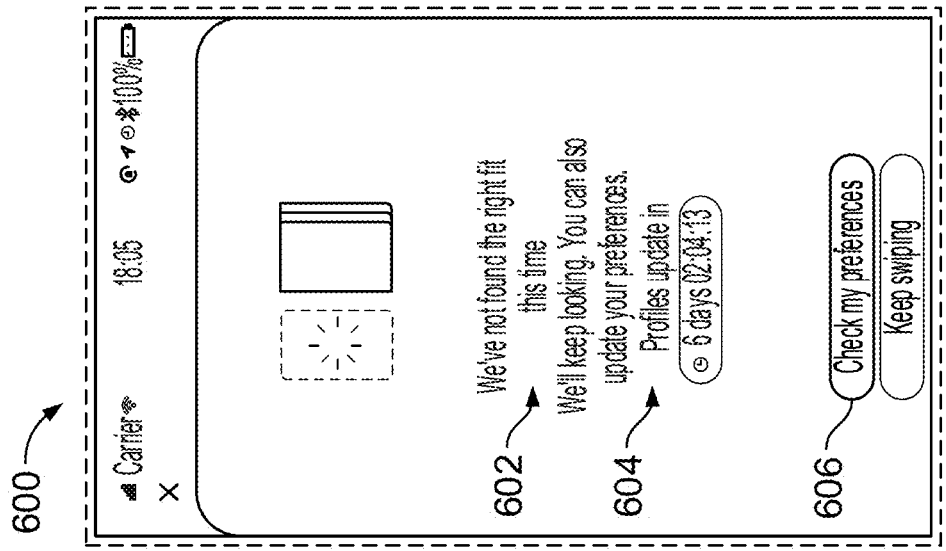
FIG. 6 illustrates a user interface.

In some implementations, if no curated profiles are identified during the curated match process, then the matching engine 142 can cause the social network application 122 to display a GUI 600, as shown in FIG. 6. The GUI 600 can include an indication 602 that no curated profiles were found, and an indication 604 of when the user should expect to receive curated profiles. In some implementations, the GUI 600 includes an option 606 for the user to update their answers to the targeted questions, which can cause the social network application 122 to redisplay the targeted questions discussed with reference to FIGS. 3A-3C.

Once a user has voted 'yes' on a curated profile, the matching engine 142 can place the user's own profile into the queue of profiles to be viewed by the curated profile user. If the curated profile user also votes 'yes' on the user's profile, a curated match is established between the two accounts. On the other hand, if the curated profile user votes 'no' on the user's profile, no further connection is established between the two users. Once a curated match is established, the matching engine 142 can supply a notification (e.g., a push notification) of the curated match to either or both of the matched users with a prompt to contact the other matched user.

Figures 7A, 7B:
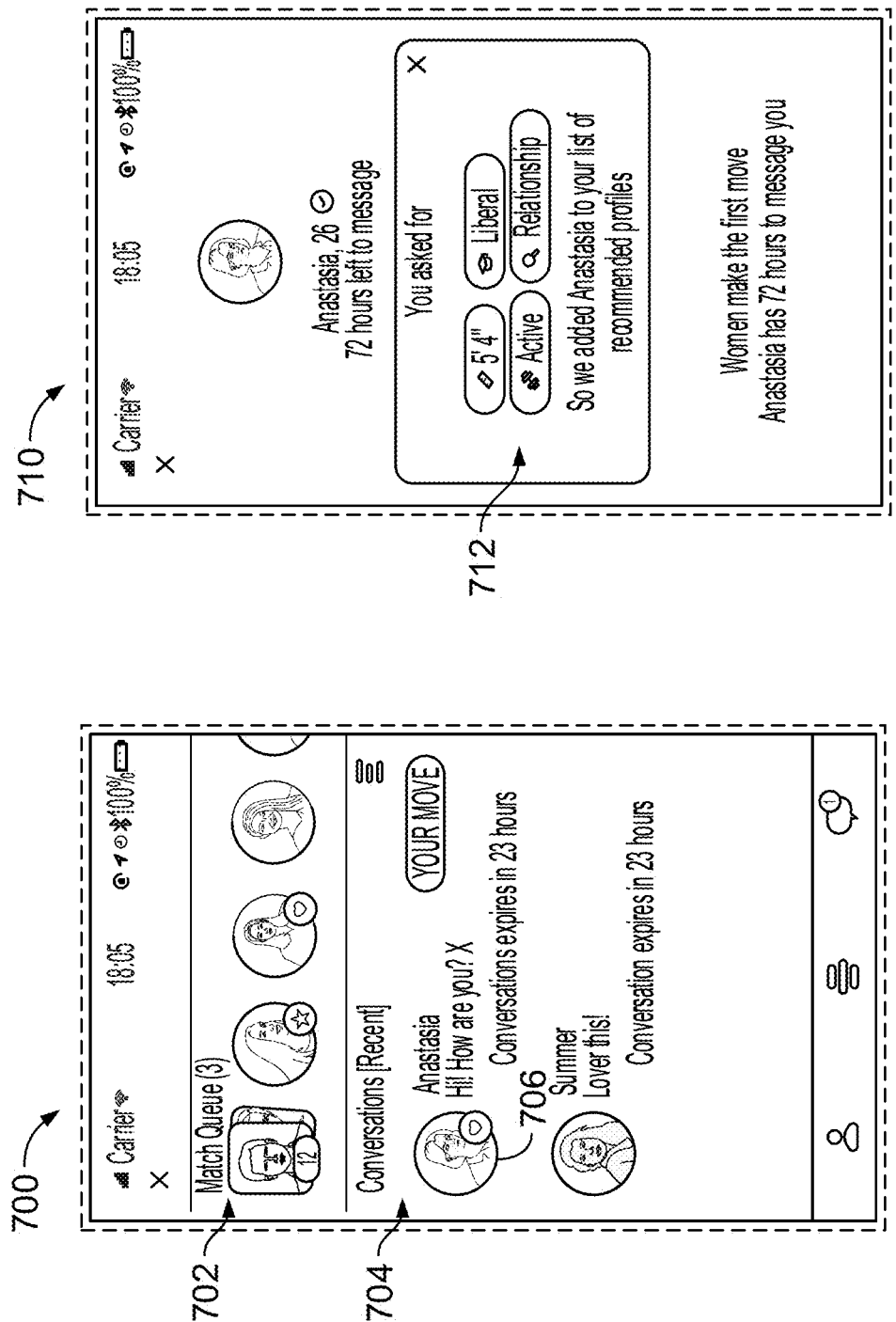
FIGS. 7A and 7B illustrate user interfaces.
Like reference symbols in the various drawings indicate like elements.

Once the matching engine 142 receives an acceptance of the curated match (210), such as an indication that each individual selected 'yes' on each other's profile, the matching engine 142 enables networked communications between the matched user (212). In some implementations, the matching engine 142 enables networked communication between the individuals in a messaging system 700 of the social network application 122, as shown in FIG. 7A. The messaging system 700 can include an indication 702 of all matched individuals and a list 704 of active conversations with matched individuals. The list 704 of conversations can include information about the matched individual (e.g., name, picture, etc.) and a preview of the most recent reply in the conversation. In some implementations, matches or conversations, or both, can be configured to expire after a predefined period of time (e.g., 24 hours), at which time the conversation or the match itself is deleted absent further action by a user. The list 704 (and other portions of the messaging system 700) can include a visual indicator 706 to distinguish curated matches from "normal" matches (e.g., those matches not formed from the curated matching process 200).

When a user selects a conversation from the conversation list 700, they are directed to a direct messaging interface 710 with the selected individual, as shown in FIG. 7B. In some implementations, if the selected conversation is with a curated match, the messaging system includes an indication 712 of the curated match and the common interests between the matched individuals. In some implementations, the system can require that a female user make the first move to facilitate female-first communications.

The approaches described here can be implemented at least in part using a computer storage product with a computer readable storage medium having computer code thereon for performing various computer-implemented operations. The media and computer code may be those specially designed and constructed for the purposes of the approaches described here, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, the approaches described here may be implemented using JAVA®, C++, or other programming language and development tools. In some examples, the approaches described here may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the approaches described here. Thus, the foregoing descriptions of specific embodiments are presented for purposes of illustration and description. They are not intended to be exhaustive or to limit the invention to the precise forms disclosed;

obviously, many modifications and variations are possible in view of the above teachings. The embodiments were chosen and described in order to best explain the principles of the approaches described here and its practical applications, they thereby enable others skilled in the art to best utilize the approaches described here and various embodiments with various modifications as are suited to the particular use contemplated. Other implementations not specifically described here are also within the scope of the following claims.

What is claimed is:

1. A computer-implemented method, comprising:
supplying to a client device data for display in a graphical user interface, the data including a set of prompts to an individual to specify criteria for identification of one or more other individuals;
receiving the criteria from the client device;
identifying potential matches between the individual and one or more individuals from a pool of individuals based on the criteria;
selecting a subset of potential matches from the potential matches, the subset of potential matches having up to a predetermined number of potential matches;
determining a next scheduled occurrence of a recurring interval for supplying matches to users; and
supplying to the client device profile information for the subset of potential matches at the next scheduled occurrence of the recurring interval for supplying matches to users.

2. The method of claim 1, wherein the prompts comprise a plurality of targeted questions for identification of the one or more other individuals, and wherein the criteria comprises answers selected from a predefined set of answers for each of the targeted questions.

3. The method of claim 1, wherein identifying the potential matches between the individual and the one or more other individuals comprises:
identifying a plurality of distinct groups of individuals from the pool of individuals; and
applying the criteria to each of the plurality of distinct groups of individuals to identify the potential matches.

4. The method of claim 3, wherein identifying the plurality of distinct groups of individuals comprises applying at least one criteria related to use of a social media application to the pool of individuals.

5. The method of claim 3, wherein identifying the plurality of distinct groups of individuals comprises applying two or more different matching models to the pool of individuals.

6. The method of claim 3, wherein selecting the subset of potential matches from the potential matches comprises selecting at least one potential match from each of the plurality of distinct groups.

7. The method of claim 6, wherein each of the potential matches are associated with a rank or score, and wherein the potential match selected from each of the plurality of distinct groups comprises the potential match having the highest rank or score within the group.

8. The method of claim 1, wherein identifying the potential matches between the individual and the one or more other individuals comprises applying at least one filter to the pool of individuals based on the criteria.

9. The method of claim 1, further comprising:
collecting a match acceptance from the client device for a second individual identified in the subset of potential matches; and
in response to the match acceptance, enabling network communication between the individual and the second individual.

10. A system, comprising:
at least one processor; and
memory storing instructions executable by the at least one processor to cause the at least one processor to perform operations comprising:
supplying to a client device data for display in a graphical user interface, the data including a set of prompts to an individual to specify criteria for identification of one or more other individuals;
receiving the criteria from the client device;
identifying potential matches between the individual and one or more individuals from a pool of individuals based on the criteria;
selecting a subset of potential matches from the potential matches, the subset of potential matches having up to a predetermined number of potential matches;
determining a next scheduled occurrence of a recurring interval for supplying matches to users; and
supplying to the client device profile information for the subset of potential matches at the next scheduled occurrence of the recurring interval for supplying matches to users.

11. The system of claim 10, wherein the prompts comprise a plurality of targeted questions for identification of the one or more other individuals, and wherein the criteria comprises answers selected from a predefined set of answers for each of the targeted questions.

12. The system of claim 10, wherein identifying the potential matches between the individual and the one or more other individuals comprises:
identifying a plurality of distinct groups of individuals from the pool of individuals; and
applying the criteria to each of the plurality of distinct groups of individuals to identify the potential matches.

13. The system of claim 12, wherein identifying the plurality of distinct groups of individuals comprises applying at least one criteria related to use of a social media application to the pool of individuals.

14. The system of claim 10, wherein each of the potential matches are associated with a rank or score, and wherein selecting the subset of potential matches from the potential matches comprises selecting up to the predetermined number of potential matches having the highest rank or score.

15. The system of claim 10, wherein identifying the potential matches between the individual and the one or more other individuals comprises applying at least one filter to the pool of individuals based on the criteria.

16. At least one non-transitory computer-readable storage medium storing instructions executable by at least one processor to cause the at least one processor to perform operations comprising:
supplying to a client device data for display in a graphical user interface, the data including a set of prompts to an individual to specify criteria for identification of one or more other individuals;
receiving the criteria from the client device;
identifying potential matches between the individual and one or more individuals from a pool of individuals based on the criteria;

selecting a subset of potential matches from the potential matches, the subset of potential matches having up to a predetermined number of potential matches;

determining a next scheduled occurrence of a recurring interval for supplying matches to users; and supplying to the client device profile information for the subset of potential matches at the next scheduled occurrence of the recurring interval for supplying matches to users.

17. The at least one non-transitory computer-readable storage medium of claim 16, wherein the prompts comprise a plurality of targeted questions for identification of the one or more other individuals, and wherein the criteria comprises answers selected from a predefined set of answers for each of the targeted questions.

18. The at least one non-transitory computer-readable storage medium of claim 16, wherein identifying the potential matches between the individual and the one or more other individuals comprises:

identifying a plurality of distinct groups of individuals from the pool of individuals; and applying the criteria to each of the plurality of distinct groups of individuals to identify the potential matches.

19. The at least one non-transitory computer-readable storage medium of claim 16, wherein each of the potential matches are associated with a rank or score, and wherein selecting the subset of potential matches from the potential matches comprises selecting up to the predetermined number of potential matches having the highest rank or score.

20. The at least one non-transitory computer-readable storage medium of claim 16, wherein identifying the potential matches between the individual and the one or more other individuals comprises applying at least one filter to the pool of individuals based on the criteria.

* * * * *